US012392855B2

(12) United States Patent
Zheng et al.

(10) Patent No.: US 12,392,855 B2
(45) Date of Patent: Aug. 19, 2025

(54) TWO-DIMENSIONAL DIRECTION-OF-ARRIVAL ESTIMATION METHOD FOR COPRIME SURFACE ARRAY BASED ON VIRTUAL DOMAIN TENSOR FILLING

(71) Applicant: Zhejiang University, Zhejiang (CN)

(72) Inventors: Hang Zheng, Zhejiang (CN); Chengwei Zhou, Zhejiang (CN); Zhiguo Shi, Zhejiang (CN); Yong Wang, Zhejiang (CN); Jiming Chen, Zhejiang (CN)

(73) Assignee: Zhejiang University, Zhejiang (CN)

( * ) Notice: Subject to any disclaimer, the term of this patent is extended or adjusted under 35 U.S.C. 154(b) by 0 days.

(21) Appl. No.: 17/920,401

(22) PCT Filed: Feb. 16, 2022

(86) PCT No.: PCT/CN2022/076430
§ 371 (c)(1),
(2) Date: Oct. 21, 2022

(87) PCT Pub. No.: WO2023/137812
PCT Pub. Date: Jul. 27, 2023

(65) Prior Publication Data
US 2024/0210510 A1    Jun. 27, 2024

(30) Foreign Application Priority Data
Jan. 21, 2022 (CN) .......................... 202210077881.1

(51) Int. Cl.
*G01S 3/14*     (2006.01)
(52) U.S. Cl.
CPC .................................. *G01S 3/143* (2013.01)

(58) Field of Classification Search
None
See application file for complete search history.

(56) References Cited

U.S. PATENT DOCUMENTS

| 2003/0058153 A1 | 3/2003 | Yu |
| 2016/0172767 A1 | 6/2016 | Ray |

FOREIGN PATENT DOCUMENTS

| CN | 104749552 | 7/2015 |
| CN | 106896340 | 6/2017 |

(Continued)

OTHER PUBLICATIONS

"International Search Report (Form PCT/ISA/210) of PCT/CN2022/076430," mailed on Jul. 27, 2022, pp. 1-5.

(Continued)

*Primary Examiner* — Whitney Moore
(74) *Attorney, Agent, or Firm* — JCIPRNET (57) ABSTRACT

Disclosed in the present invention is a two-dimensional direction-of-arrival estimation method for a coprime surface array based on virtual domain tensor filling, which mainly solves the problems of the loss of multi-dimensional signal structural information and the inability to fully utilize virtual domain statistics in the existing method. The steps thereof are as follows: constructing a coprime surface array; modeling a tensor of a received signal of the coprime surface array; constructing an augmented non-continuous virtual surface array based on cross-correlation tensor transformation of the coprime surface array; deriving a virtual domain tensor based on mirror extension of the non-continuous virtual surface array; dispersing contiguous missing elements by reconstructing the virtual domain tensor; filling the virtual domain tensor based on the minimization of a tensor kernel norm; and decomposing a filled virtual domain tensor to obtain a direction-of-arrival estimation result.

4 Claims, 4 Drawing Sheets

(56) References Cited

FOREIGN PATENT DOCUMENTS

| | | |
|---|---|---|
| CN | 107037392 | 8/2017 |
| CN | 107102291 | 8/2017 |
| CN | 107315160 | 11/2017 |
| CN | 107329108 | 11/2017 |
| CN | 107422295 | 12/2017 |
| CN | 107589399 | 1/2018 |
| CN | 108344967 | 7/2018 |
| CN | 108710102 | 10/2018 |
| CN | 109143152 | 1/2019 |
| CN | 109143228 | 1/2019 |
| CN | 110244259 | 9/2019 |
| CN | 110927661 | 3/2020 |
| CN | 111610486 | 9/2020 |
| CN | 111624545 | 9/2020 |
| CN | 112904272 | 6/2021 |

OTHER PUBLICATIONS

"Written Opinion of the International Searching Authority (Form PCT/ISA/237) of PCT/CN2022/076430," mailed on Jul. 27, 2022, pp. 1-4.

○ virtual array element
◌ hole

TWO-DIMENSIONAL DIRECTION-OF-ARRIVAL ESTIMATION METHOD FOR COPRIME SURFACE ARRAY BASED ON VIRTUAL DOMAIN TENSOR FILLING

CROSS-REFERENCE TO RELATED APPLICATION

This application is a 371 of international application of PCT application serial no. PCT/CN2022/076430, filed on Feb. 16, 2022, which claims the priority benefit of China application no. 202210077881.1, filed on Jan. 21, 2022. The entirety of each of the above mentioned patent applications is hereby incorporated by reference herein and made a part of this specification.

BACKGROUND

Technical Field

The present invention belongs to the technical field of array signal processing and relates to a statistical signal processing technology based on sparse array virtual domain second-order high-dimensional statistics, in particular to a two-dimensional direction-of-arrival estimation method for coprime surface array based on virtual domain tensor filling, which can be used for target positioning.

Description of Related Art

As a sparse array with a systematic structure, a coprime array has the advantages of a large aperture, and high resolution. It can break through the performance bottleneck of traditional uniform array direction-of-arrival estimation in estimation performance and cost overhead. Since sparsely arranged array elements of the coprime array do not meet a Nyquist sampling rate, in order to realize a Nyquist matching direction-of-arrival estimation, a common practice is to calculate second-order statistics of a received signal of the coprime array to construct an augmented non-contiguous virtual array, and extract a continuous part therefrom to realize Nyquist matching processing based on a virtual domain second-order equivalent signal. Further, in order to make full use of all the non-contiguous virtual array elements, an existing method fills a non-contiguous virtual array to improve the performance of the direction-of-arrival estimation. However, the above method usually expresses the received signal as a vector, and derives the virtual domain second-order equivalent signal by vectorizing a covariance matrix of the received signal; in a scenario where a coprime surface array is deployed, since the received signal of the coprime surface array covers two-dimensional spatial information, this vectorized signal processing method destroys an original spatial information structure of the received signal of the coprime surface array, which will cause serious performance loss.

In order to preserve the structured information of the multi-dimensional received signal, a tensor, as a multi-dimensional data type, has been used in the field of array signal processing to characterize a received signal covering the multi-dimensional spatial information, and to perform feature analysis and effective information extraction, so as to achieve a high-precision and high-resolution direction-of-arrival estimation. However, when it relates to the statistic processing of the virtual field tensor of the coprime surface array, the augmented multi-dimensional non-contiguous virtual array would have holes in the whole piece, resulting in the corresponding virtual field tensor with contiguous missing elements. The traditional tensor filling method applied to image inpainting is premised on a random distribution of the missing elements in the tensor, so it cannot effectively fill the virtual field tensor. Therefore, for a virtual domain tensor model of the coprime surface array, how to effectively use all the non-continuous virtual domain tensor statistics information to achieve high-precision and high-resolution two-dimensional direction-of-arrival estimation is still an urgent problem to be solved.

SUMMARY

The purpose of the present invention is to propose a two-dimensional direction-of-arrival estimation method for a coprime surface array based on virtual domain tensor filling in order to solve the problems of loss of multi-dimensional signal structure information and inability to fully utilize virtual domain statistics in existing methods. It provides a feasible idea and an effective solution to realize the high-precision and high-resolution two-dimensional direction-of-arrival estimation of Nyquist matching by making full use of all the non-continuous virtual domain tensor statistics information corresponding to the coprime surface array.

The purpose of the present invention is to realize through the following technical solutions: a two-dimensional direction-of-arrival estimation method for a coprime surface array based on virtual domain tensor filling, wherein the method comprises the following steps:

(1) using $4M_xM_y+N_xN_y-1$ physical antenna array elements by a receiving end, and performing constructing according to a structure of a coprime surface array, wherein $M_x$, $N_x$ and $M_y$, $N_y$ are a pair of coprime integers respectively; decomposing the coprime surface array into two sparse uniform sub-surface arrays $\mathbb{P}_1$ and $\mathbb{P}_2$, wherein $\mathbb{P}_1$ contains $2M_x \times 2M_y$ antenna array elements, array element spacings in an x axial direction and a y axial direction are respectively $N_xd$ and $N_yd$, $\mathbb{P}_2$ includes $N_x \times N_y$ antenna array elements, array element spacings in the x axial direction and the y axial direction are respectively $M_xd$ and $M_yd$, and the unit interval d is taken as half of the wavelength $\lambda$ of an incident narrowband signal, that is, $d=\lambda/2$;

(2) assuming that there are K far-field narrowband uncorrelated signal sources from $\{(\theta_1, \varphi_1), (\theta_2, \varphi_2), \ldots, (\theta_K, \varphi_K)\}$ directions, $\theta_k$ and $\varphi_k$ are respectively an azimuth angle and an elevation angle of a kth incident signal source, $k=1, 2, \ldots, K$, utilizing a three-dimensional tensor $$\mathcal{X}_{\mathbb{P}_1} \in \mathbb{C}^{2M_x \times 2M_y \times T}$$

to express T sampling snapshot signals of a sparse uniform sub-surface array $\mathbb{P}_1$ as follows:

$$\mathcal{X}_{\mathbb{P}_1} = \sum_{k=1}^{K} a_x^{(\mathbb{P}_1)}(\theta_k, \varphi_k) \circ a_y^{(\mathbb{P}_1)}(\theta_k, \varphi_k) \circ s_k + \mathcal{N}_{\mathbb{P}_1},$$

wherein $s_k=[s_{k,1}, s_{k,2}, \ldots, s_{k,T}]^T$ is a multi-snapshot sampling signal waveform corresponding to the kth incident signal source, $[\cdot]^T$ represents a transpose operation, ∘ represents the outer product of a vector, $N_{\mathbb{P}_1}$ is a noise tensor independent of each signal source, $$a_x^{(\mathbb{P}_1)}(\theta_k, \varphi_k) \text{ and } a_y^{(\mathbb{P}_1)}(\theta_k, \varphi_k)$$

are respectively steering vectors of $\mathbb{P}_1$ in an x axial direction and a y axial direction, correspond to a signal source with an incoming wave direction of $(\theta_k, \varphi_k)$, and are expressed as follows:

$$a_x^{(\mathbb{P}_1)}(\theta_k, \varphi_k) = \left[1, e^{-j\pi x_{\mathbb{P}_1}^{(2)}\mu_k}, \ldots, e^{-j\pi x_{\mathbb{P}_1}^{(2M_x)}\mu_k}\right]^T,$$

$$a_y^{(\mathbb{P}_1)}(\theta_k, \varphi_k) = \left[1, e^{-j\pi y_{\mathbb{P}_1}^{(2)}\nu_k}, \ldots, e^{-j\pi y_{\mathbb{P}_1}^{(2M_x)}\nu_k}\right]^T,$$

and wherein $$\left\{x_{\mathbb{P}_1}^{(1)}, x_{\mathbb{P}_1}^{(2)}, \ldots, x_{\mathbb{P}_1}^{(2M_x)}\right\} 和 \left\{y_{\mathbb{P}_1}^{(1)}, y_{\mathbb{P}_1}^{(2)}, \ldots, y_{\mathbb{P}_1}^{(2M_y)}\right\} \quad (1)$$

represent respectively actual positions of physical antenna elements of the sparse uniform sub-surface array $\mathbb{P}_1$ in the x axial direction and y axial direction, and $$x_{\mathbb{P}_1}^{(1)} = 0,\ y_{\mathbb{P}_1}^{(1)} = 0,\ \mu_k = \sin(\varphi_k)\cos(\theta_k),\ \nu_k = \sin(\varphi_k)\sin(\theta_k),\ j = \sqrt{-1};$$

expressing the T sampled snapshot signals of the sparse uniform sub-surface array $\mathbb{P}_2$ by another three-dimensional tensor $$X_{\mathbb{P}_2} \in \mathbb{C}^{N_x \times N_y \times T}$$

as follows:

$$X_{\mathbb{P}_2} = \sum_{k=1}^{K} a_x^{(\mathbb{P}_2)}(\theta_k, \varphi_k) \circ a_y^{(\mathbb{P}_2)}(\theta_k, \varphi_k) \circ s_k + N_{\mathbb{P}_2},$$

wherein $N_{\mathbb{P}_2}$ a noise tensor independent of each signal source, $$a_x^{(\mathbb{P}_2)}(\theta_k, \varphi_k) \text{ and } a_y^{(\mathbb{P}_2)}(\theta_k, \varphi_k)$$

are respectively steering vectors of $\mathbb{P}_2$ in an x axial direction and a y axial direction, correspond to a signal source with an incoming wave direction of $(\theta_k, \varphi_k)$, and are expressed as follows:

$$a_x^{(\mathbb{P}_2)}(\theta_k, \varphi_k) = \left[1, e^{-j\pi x_{\mathbb{P}_2}^{(2)}\mu_k}, \ldots, e^{-j\pi x_{\mathbb{P}_2}^{(N_x)}\mu_k}\right]^T,$$

$$a_y^{(\mathbb{P}_2)}(\theta_k, \varphi_k) = \left[1, e^{-j\pi y_{\mathbb{P}_2}^{(2)}\nu_k}, \ldots, e^{-j\pi y_{\mathbb{P}_2}^{(N_x)}\nu_k}\right]^T,$$

and wherein $$\left\{x_{\mathbb{P}_2}^{(1)}, x_{\mathbb{P}_2}^{(2)}, \ldots, x_{\mathbb{P}_2}^{(N_x)}\right\} 和 \left\{y_{\mathbb{P}_2}^{(1)}, y_{\mathbb{P}_2}^{(2)}, \ldots, y_{\mathbb{P}_2}^{(N_y)}\right\}$$

represent respectively actual positions of physical antenna elements of the sparse uniform sub-surface array $\mathbb{P}_2$ in the x axial direction and y axial direction, and $$x_{\mathbb{P}_2}^{(1)} = 0,\ y_{\mathbb{P}_2}^{(1)} = 0;$$

obtaining a second-order cross-correlation tensor $$R_{\mathbb{P}_1 \mathbb{P}_2} \in \mathbb{C}^{2M_x \times 2M_y \times N_x \times N_y}$$

by solving cross-correlation statistic of three-dimensional tensors $X_{\mathbb{P}_1}$ and $X_{\mathbb{P}_2}$:

$$R_{\mathbb{P}_1 \mathbb{P}_2} = E\left[ <X_{\mathbb{P}_1}, X_{\mathbb{P}_2}^*>_3 \right] =$$

$$\sum_{k=1}^{K} \sigma_k^2 a_x^{(\mathbb{P}_1)}(\theta_k, \varphi_k) \circ a_y^{(\mathbb{P}_1)}(\theta_k, \varphi_k) \circ a_x^{(\mathbb{P}_2)*}(\theta_k, \varphi_k) \circ a_y^{(\mathbb{P}_2)*}(\theta_k, \varphi_k) + N_{\mathbb{P}_1 \mathbb{P}_2},$$

wherein $\sigma_k^2 = E[s_k s_k^*]$ represents power of a kth incident signal source, $$N_{\mathbb{P}_1 \mathbb{P}_2} = E\left[ <N_{\mathbb{P}_1}, N_{\mathbb{P}_2}^*>_3 \right]$$

represents the cross-correlation noise tensor, $<\bullet, \bullet>_r$ represents a tensor contraction operation of the two tensors along a rth dimension, $E[\bullet]$ represents a mathematical expectation operation, and $(\bullet)^*$ represents a conjugation operation; the cross-correlation noise tensor $N_{\mathbb{P}_1 \mathbb{P}_2}$ only has an element with a value $\sigma_n^2$ in the (1, 1, 1, 1)th position, wherein $\sigma_n^2$ represents the noise power, and elements in other positions have the same value 0;

(3) defining dimension sets $J_1=\{1,3\}$, $J_2=\{2,4\}$, and obtaining a virtual domain signal $$U_W \in \mathbb{C}^{2M_x N_x \times 2M_y N_y}$$

by performing a tensor transformation of dimension merging on the cross-correlation tensor $R_{\mathbb{P}_1 \mathbb{P}_2}$:

$$U_W \triangleq R_{\mathbb{P}_1 \mathbb{P}_2 \{J_1, J_2\}} = \sum_{k=1}^{K} \sigma_k^2 b_x(k) \circ b_y(k),$$

wherein by respectively forming a difference set array on the exponential term, $$b_x(k) = a_x^{(\mathbb{P}2)^*}(\theta_k, \varphi_k) \otimes a_x^{(\mathbb{P}1)}(\theta_k, \varphi_k) \text{ and } b_y(k) = a_y^{(\mathbb{P}2)^*}(\theta_k, \varphi_k) \otimes a_y^{(\mathbb{P}1)}(\theta_k, \varphi_k)$$

construct a two-dimensional augmented virtual surface array along the x axial direction and the y axial direction, $\otimes$ represents the Kronecker product; therefore, $U_W$ corresponds to a non-continuous virtual surface array W of size $J_{W_x} \times J_{W_y}$, $J_{W_x} = 3M_x N_x - M_x - N_x + 1$, $J_{W_y} = 3M_y N_y - M_y - N_y + 1$, and the non-continuous virtual surface array W contains holes in an entire row and an entire column, that is, missing elements;

(4) constructing a virtual surface array $\overline{W}$ that mirrors the non-continuous virtual surface array W about the coordinate axis, and superimposing the W and $\overline{W}$ on a third dimension into a three-dimensional non-continuous virtual cubic array Q of size $J_{\mathbb{Q}_x} \times J_{\mathbb{Q}_y} \times J_{\mathbb{Q}_z}$, wherein $J_{\mathbb{Q}_x} = J_{W_x}$, $J_{\mathbb{Q}_y} = J_{W_y}$ and $J_{\mathbb{Q}_z} = 2$;

correspondingly, rearranging elements in the conjugate transposed signal $U_W^*$ of the virtual domain signal $U_W$ to correspond to positions of virtual array elements in $\overline{W}$, so as to obtain a virtual domain signal $U_{\overline{W}}$ corresponding to the virtual surface array $\overline{W}$; superimposing $U_W$ and $U_{\overline{W}}$ in the third dimension to obtain the virtual domain tensor $U_{\mathbb{Q}}$ corresponding to the non-continuous virtual cubic array $\mathbb{Q}$, which is represented as:

$$U_{\mathbb{Q}} = \sum_{k=1}^{K} \sigma_k^2 \tilde{b}_x(k) \circ \tilde{b}_y(k) \circ c_k,$$

wherein $\tilde{b}_x(k)$ and $\tilde{b}_y(k)$ are respectively steering vectors of the non-continuous virtual cubic array $\mathbb{Q}$ on the x axis and the y axis, and correspond to the signal source with an incoming wave direction $(\theta_k, \varphi_k)$; due to existence of the holes in $\mathbb{Q}$, $\tilde{b}_x(k)$ and $\tilde{b}_y(k)$ respectively correspond to elements in the hole positions in $\mathbb{Q}$ in the x axial and y axial directions which are set to be zero, $$c_k = \left[1, e^{-j\pi\left(-(M_x M_y + M_x + M_y)\mu_k - (N_x N_y + N_x + N_y)\nu_k\right)}\right]^T$$

represents a mirror transformation factor vector corresponding to W and $\overline{W}$; since the non-continuous virtual surface array W contains the holes in the entire row and the entire column, the non-continuous virtual cubic array $\mathbb{Q}$ obtained by superimposing W with a mirror image part thereof $\overline{W}$ contains contiguous holes, corresponds to virtual field tensor $U_{\mathbb{Q}}$ of the non-continuous virtual cubic array $\mathbb{Q}$, and thus contains contiguous missing elements;

(5) designing a translation window of size $P_x \times P_y \times 2$ to select a sub-tensor $U_{\mathbb{Q}(1,1)}$ of the virtual domain tensor $U_{\mathbb{Q}}$, which contains elements of which indices are (1: $P_x$–1), (1: $P_y$–1) and (1:2) respectively in three dimensions of $U_{\mathbb{Q}}$; then, translating the translation window by one element in turn along the x axial direction and the y axial direction, dividing $U_{\mathbb{Q}}$ into $L_x \times L_y$ sub-tensors, expressed as $$U_{\mathbb{Q}(s_x, s_y)}, s_x = 1, 2, \ldots, L_x, s_y = 1, 2, \ldots, L_y,$$

wherein a value range of the translation window size is as follows:

$$2 \le P_x \le J_{\mathbb{Q}_x} - 1,$$
$$2 \le P_y \le J_{\mathbb{Q}_y} - 1,$$

and $L_x$, $L_y$, $P_x$, $P_y$ satisfy the following relationship:

$$P_x + L_x - 1 = J_{\mathbb{Q}_x},$$
$$P_y + L_y - 1 = J_{\mathbb{Q}_y},$$

superimposing the sub-tensors $U_{\mathbb{Q}(s_x, s_y)}$ with the same index subscript $s_y$ in the fourth dimension to obtain $L_y$ four-dimensional tensors with $P_x \times P_y \times 2 \times L_x$ dimensions; further, superimposing the $L_y$ four-dimensional tensors in a fifth dimension to obtain a five-dimensional virtual domain tensor $$T_{\mathbb{Q}} \in \mathbb{C}^{P_x \times P_y \times 2 \times L_x \times L_y},$$

wherein the five-dimensional virtual domain tensor $T_{\mathbb{Q}}$ contains spatial angle information in the x axial direction and y axial direction, spatial mirror transformation information, and spatial translation information in the x axial direction and the y axial direction; defining the dimension sets $K_1 = \{1, 2\}$, $K_2 = \{3\}$, $K_3 = \{4, 5\}$, and merging through the dimensions of $T_{\mathbb{Q}}$ to obtain a three-dimensional reconstructed virtual domain tensor $$K_{\mathbb{Q}} \in \mathbb{C}^{P_x P_y \times L_x L_y \times 2};$$

$$K_{\mathbb{Q}} \triangleq T_{\mathbb{Q}\{K_1, K_2, K_3\}}$$

wherein the three dimensions of $K_{\mathbb{Q}}$ respectively represent the spatial angle information, the spatial translation information and the spatial mirror transformation information, thus, the contiguous missing elements in the original virtual domain tensor $U_{\mathbb{Q}}$ are randomly distributed to the three spatial dimensions contained in $K_{\mathbb{Q}}$;

(6) designing a virtual domain tensor filling optimization problem based on tensor kernel norm minimization:

$$\min_{\overline{K}_{\overline{\mathbb{Q}}}} \|\overline{K}_{\overline{\mathbb{Q}}}\|_*$$

$$\text{s.t. } P_{\overline{\Omega}}(\overline{K}_{\overline{\mathbb{Q}}}) = P_{\overline{\Omega}}(K_{\mathbb{Q}}),$$

wherein the optimization variable $$\overline{K}_{\overline{\mathbb{Q}}} \in \mathbb{C}^{P_x P_y \times L_x L_y \times 2}$$

is the filled virtual domain tensor corresponding to the virtual uniform cubic array $\overline{\mathbb{Q}}$, $\|\cdot\|_*$ represents the tensor kernel norm, $\overline{\Omega}$ represents a position index set of the non-missing elements in $K_{\mathbb{Q}}$, $P_{\overline{\Omega}}(\cdot)$ represents the mapping of the tensor on $\overline{\Omega}$; since the kernel norm is a convex function, the virtual domain tensor filling problem based on the minimization of the tensor kernel norm is a solvable convex optimization problem, and wherein the convex optimization problem is solved to obtain $\overline{K}_{\overline{\mathbb{Q}}}$;

(7) expressing the filled virtual domain tensor $\overline{K}_{\overline{\mathbb{Q}}}$ as follows:

$$\overline{K}_{\overline{\mathbb{Q}}} = \sum_{k=1}^{K} \sigma_k^2 p_k \circ q_k \circ c_k,$$

wherein $p_k = d_y(k) \otimes d_x(k),$ $q_k = g_y(k) \otimes g_x(k)$ are the space factors of $\overline{K}_{\overline{\mathbb{Q}}}$, $$d_x(k) = \left[ e^{-j\pi(-M_x N_x + M_x)\mu_k}, e^{-j\pi(-M_x N_x + M_x + 1)\mu_k}, \ldots, e^{-j\pi(2M_x N_x - N_x)\mu_k} \right]^T,$$

$$d_y(k) = \left[ e^{-j\pi(-M_y N_y + M_y)\nu_k}, e^{-j\pi(-M_y N_y + M_y + 1)\nu_k}, \ldots, e^{-j\pi(2M_y N_y - N_y)\nu_k} \right]^T,$$

respectively represent the steering vectors of the virtual uniform cubic array $\overline{\mathbb{Q}}$ along the x axial direction and y axial directions, $$g_x(k) = \left[ 1, e^{-j\pi\mu_k}, \ldots, e^{-j\pi(L_x - 1)\mu_k} \right]^T,$$

$$g_y(k) = \left[ 1, e^{-j\pi\nu_k}, \ldots, e^{-j\pi(L_y - 1)\nu_k} \right]^T,$$

are respectively spatial translation factor vectors corresponding to the x axial direction and y axial direction in the process of intercepting the sub-tensor by the translation window; performing canonical polyadic decomposition on the filled virtual domain tensor $\overline{K}_{\mathbb{Q}}$ to obtain the estimated values of three factor vectors $p_k$, $q_k$ and $c_k$, which are expressed as $\hat{p}_k$, $\hat{q}_k$ and $\hat{c}_k$; and extracting angle parameters contained in exponential terms of $\hat{p}_k$ and $\hat{q}_k$ to obtain a two-dimensional direction-of-arrival estimation result $(\hat{\theta}_k, \hat{\varphi}_k)$.

Further, the coprime surface array structure described in step (1) is specifically described as follows: constructing a pair of sparse uniform sub-surface arrays $\mathbb{P}_1$ and $\mathbb{P}_2$ in a plane coordinate system xoy, wherein $\mathbb{P}_1$ contains $2M_x \times 2M_y$ antenna elements, and the array element spacings in the x axial direction and the y axial direction are respectively $N_x d$ and $N_y d$, and position coordinate thereof on xoy is $\{(N_x dm_x, N_y dm_y), m_x = 0, 1, \ldots, 2M_x - 1, m_y = 0, 1, \ldots, 2M_y - 1\}$; $\mathbb{P}_2$ contains $N_x \times N_y$ antenna array elements, the array element spacings in the x axial direction and the y axial direction are respectively $M_x d$ and $M_y d$, and position coordinate thereof on xoy is $\{(M_x dn_x, M_y dn_y), n_x = 0, 1, \ldots, N_x - 1, n_y = 0, 1, \ldots, N_y - 1\}$; $M_x$ and $N_x$, and $M_y$ and $N_y$ are respectively a pair of coprime integers; and combining the sub-arrays of $\mathbb{P}_1$ and $\mathbb{P}_2$ in the way that the array elements at (0, 0) position in the coordinate system overlap to obtain a coprime surface array that actually contains $4M_x M_y + N_x N_y - 1$ physical antenna array elements.

Further, for the cross-correlation tensor derivation described in step (2), in practice, obtaining $R_{\mathbb{P}_1 \mathbb{P}_2}$ by calculating the cross-correlation statistic of the tensors $X_{\mathbb{P}_1}$ and $X_{\mathbb{P}_2}$ to approximate, that is, sampling cross-correlation tensor $$\hat{R}_{\mathbb{P}_1 \mathbb{P}_2} \in \mathbb{C}^{2M_x \times 2M_y \times N_x \times N_y}:$$

$$\hat{R}_{\mathbb{P}_1 \mathbb{P}_2} = \frac{1}{T} \langle X_{\mathbb{P}_1}, X_{\mathbb{P}_2}^* \rangle_3.$$

Further, in step (7), performing the canonical polyadic decomposition on the filled virtual domain tensor $\overline{K}_{\overline{\mathbb{Q}}}$ to obtain the factor vectors $\hat{p}_k$, $\hat{q}_k$ and $\hat{c}_k$, and, then extracting the parameters $\hat{\mu}_k = \sin(\hat{\varphi}_k)\cos(\hat{\theta}_k)$ and $\hat{\nu}_k = \sin(\hat{\varphi}_k)\sin(\hat{\theta}_k)$ from $\hat{p}_k$ 和 $\hat{q}_k$ as follows:

$$\hat{\mu}_k = \left( \angle \left( \frac{\hat{p}_{k_{(\eta_1+1)}}}{\hat{p}_{k_{(\eta_1)}}} \right) + \angle \left( \frac{\hat{q}_{k_{(\eta_2+10)}}}{\hat{q}_{k_{(\eta_2)}}} \right) \right) / 2\pi,$$

$$\hat{\nu}_k = \left( \angle \left( \frac{\hat{p}_{k_{(P_x+\delta_1)}}}{\hat{p}_{k_{(\delta_1)}}} \right) + \angle \left( \frac{\hat{q}_{k_{(P_y+\delta_2)}}}{\hat{q}_{k_{(\delta_2)}}} \right) \right) / 2\pi,$$

wherein $\angle(\cdot)$ represents the operation of taking the argument of a complex number, and $a_{(a)}$ represents the ath element of a vector a; here, according to the Kronecker structure of $\hat{p}_k$ and $\hat{q}_k$, $\eta_1 \in [1, P_x P_y - 1]$ and $\eta_2 \in [1, L_x L_y - 1]$ respectively satisfy $\mod(\eta_1, P_x) \neq 0$ and $\mod(\eta_2, P_y) \neq 0$, and $\delta_1 \in [1, P_x P_y - P_x]$, $\delta_2 \in [1, L_x L_y - L_x]$, $\mod(\cdot)$ represents the operation of taking a remainder; according to the relationship between the parameter $(\mu_k, \nu_k)$ and the two-dimensional direction-of-arrival $(\theta_k, \varphi_k)$, obtaining a closed-form solution of the two-dimensional direction-of-arrival estimation $(\hat{\theta}_k, \hat{\varphi}_k)$ as follows:

$$\hat{\theta}_k = \arctan\left( \frac{\hat{\nu}_k}{\hat{\mu}_k} \right),$$

$$\hat{\varphi}_k = \sqrt{\hat{\nu}_k^2 + \hat{\mu}_k^2}.$$

Compared with the prior art, the present invention has the following advantages:

(1) The present invention derives the augmented non-continuous virtual surface array based on the cross-correlation tensor, and utilizes the mirror image expansion of the non-continuous virtual surface array to construct the three-dimensional non-continuous virtual cubic array and its corresponding virtual domain tensor, which fully preserves the structure information of all non-contiguous virtual domain statistics of the coprime array;

(2) The present invention proposes a virtual domain tensor filling mechanism for the non-contiguous virtual arrays. The virtual field tensor is reconstructed to disperse its missing elements to meet the low-rank fallibility of the virtual domain tensor. The virtual domain tensor is effectively filled to achieve the high-precision and high-resolution two-dimensional direction-of-arrival estimation.

DESCRIPTION OF THE EMBODIMENTS

The technical solution of the present invention will be described in further detail below with reference to the accompanying drawings.

Figure 1:
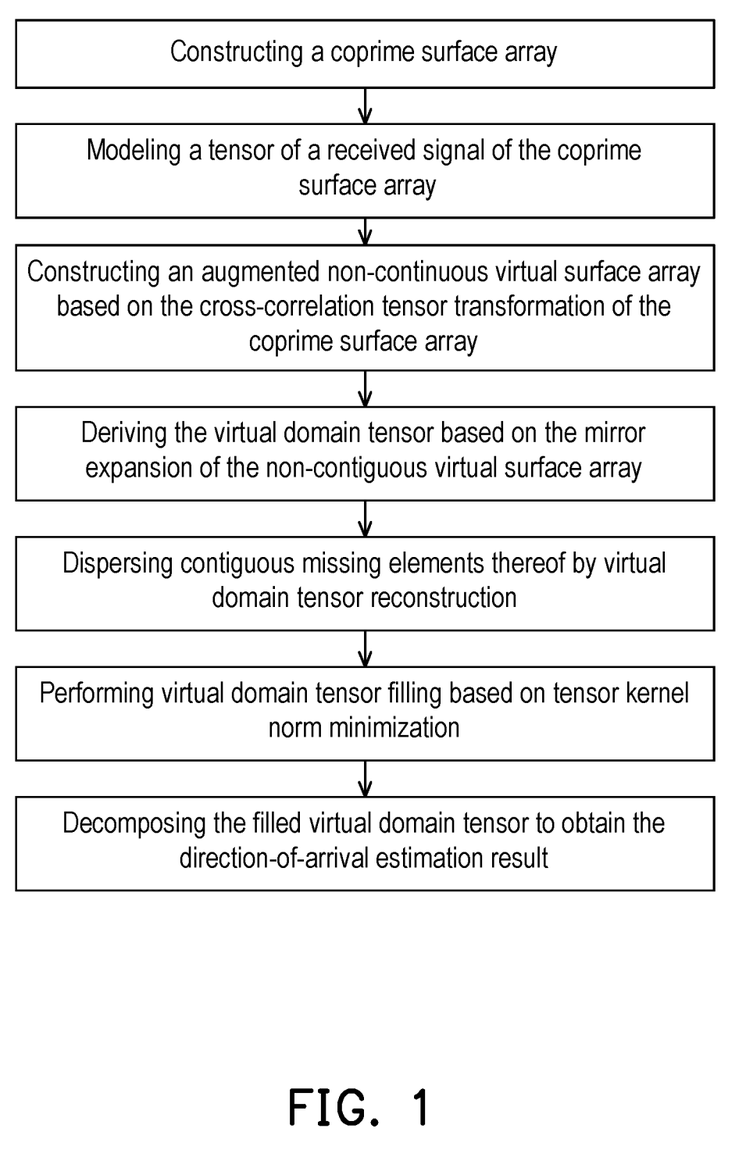
FIG. 1 is a general flow block diagram of the present invention.
Figure 2:
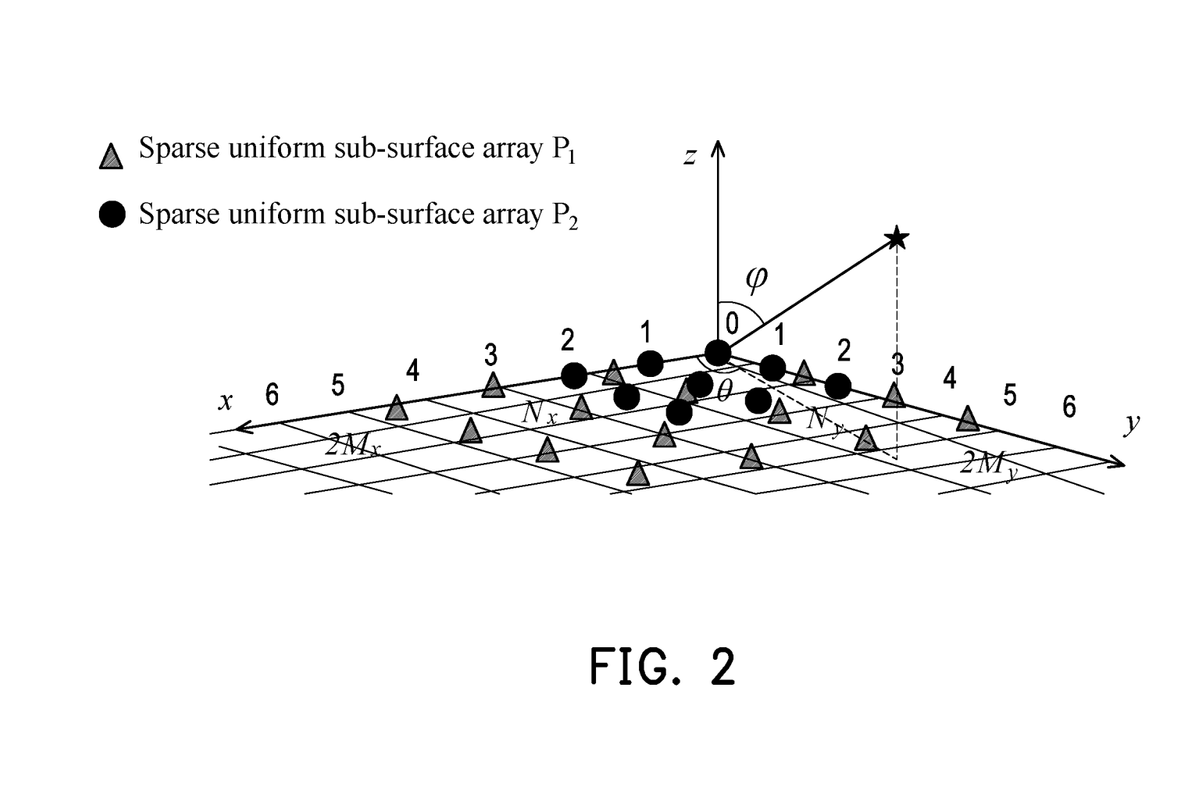
FIG. 2 is a schematic diagram of the structure of a coprime array constructed by the present invention.

The present invention proposes a two-dimensional direction-of-arrival estimation method for a coprime surface array based on virtual domain tensor filling in order to solve the problems of loss of multi-dimensional signal structure information and inability to fully utilize virtual domain statistics in existing methods. Effective filling of contiguous missing elements of an original virtual domain tensor is used to realize a Nyquist-matched two-dimensional direction-of-arrival estimation of a coprime surface array. With reference to FIG. 1, the implementation steps of the present invention are as follows:

Step 1: constructing a coprime surface array. Constructing a coprime surface array using $4M_xM_y+N_xN_y-1$ physical antenna array elements by a receiving end, as shown in FIG. 2: constructing a pair of sparse uniform sub-surface arrays $\mathbb{P}_1$ and $\mathbb{P}_2$ in a plane coordinate system xoy, wherein $\mathbb{P}_1$ contains $2M_x \times 2M_y$ antenna elements, and the array element spacings in the x axial direction and the y axial direction are respectively $N_xd$ and $N_yd$, and position coordinate thereof on xoy is $\{(N_xdm_x, N_ydm_y), m_x=0, 1, \ldots, 2M_x-1, m_y=0, 1, \ldots, 2M_y-1\}$; $\mathbb{P}_2$ contains $N_x \times N_y$ antenna array elements, the array element spacings in the x axial direction and the y axial direction are respectively $M_xd$ and $M_yd$, and position coordinate thereof on xoy is $\{(M_xdn_x, M_ydn_y), n_x=0, 1, \ldots, N_x-1, n_y=0, 1, \ldots, N_y-1\}$; $M_x$ and $N_x$, and $M_y$ and $N_y$ are respectively a pair of coprime integers; taking the unit interval d as half of the wavelength $\lambda$ of an incident narrowband signal, that is, $d=\lambda/2$; and combining the sub-arrays of $\mathbb{P}_1$ and $\mathbb{P}_2$ in the way that the array elements at (0,0) position in the coordinate system overlap to obtain a coprime surface array that actually contains $4M_xM_y+N_xN_y-1$ physical antenna array elements.

Step 2: modeling a tensor of a received signal of the coprime surface array. Assuming that there are K far-field narrowband uncorrelated signal sources from $\{(\theta_1, \varphi_1), (\theta_2, \varphi_2), \ldots, (\theta_K, \varphi_K)\}$ directions, $\theta_k$ and $\varphi_k$ are respectively an azimuth angle and an elevation angle of a kth incident signal source, $k=1, 2, \ldots, K$, superimposing the T sampling snapshot signals of the sparse uniform sub-surface array $\mathbb{P}_1$ in the coprime surface array in the third dimension to obtain a three-dimensional tensor signal $$\mathcal{X}_{\mathbb{P}_1} \in \mathbb{C}^{2M_x \times 2M_y \times T},$$

which is modeled as follows:

$$\mathcal{X}_{\mathbb{P}_1} = \sum_{k=1}^{K} a_x^{(\mathbb{P}_1)}(\theta_k, \varphi_k) \circ a_y^{(\mathbb{P}_1)}(\theta_k, \varphi_k) \circ s_k + \mathcal{N}_{\mathbb{P}_1},$$

wherein $s_k=[s_{k,1}, s_{k,2}, \ldots, s_{k,T}]^T$ is a multi-snapshot sampling signal waveform corresponding to the kth incident signal source, $[\bullet]^T$ represents a transpose operation, $\circ$ represents the outer product of a vector, $\mathcal{N}_{\mathbb{P}_1}$ is a noise tensor independent of each signal source, $$a_x^{(\mathbb{P}_1)}(\theta_k, \varphi_k) \text{ and } a_y^{(\mathbb{P}_1)}(\theta_k, \varphi_k)$$

are respectively steering vectors of $\mathbb{P}_1$ in an x axial direction and a y axial direction, correspond to a signal source with an incoming wave direction of $(\theta_k, \varphi_k)$, and are expressed as follows:

$$a_x^{(\mathbb{P}_1)}(\theta_k, \varphi_k) = \left[1, e^{-j\pi x_{\mathbb{P}_1}^{(2)} \mu_k}, \ldots, e^{-j\pi x_{\mathbb{P}_1}^{(2M_x)} \mu_k}\right]^T,$$

$$a_y^{(\mathbb{P}_1)}(\theta_k, \varphi_k) = \left[1, e^{-j\pi y_{\mathbb{P}_1}^{(2)} v_k}, \ldots, e^{-j\pi y_{\mathbb{P}_1}^{(2M_y)} v_k}\right]^T,$$

and wherein $$\{x_{\mathbb{P}_1}^{(1)}, x_{\mathbb{P}_1}^{(2)}, \ldots, x_{\mathbb{P}_1}^{(2M_x)}\} \text{和} \{y_{\mathbb{P}_1}^{(1)}, y_{\mathbb{P}_1}^{(2)}, \ldots, y_{\mathbb{P}_1}^{(2M_y)}\}$$

represent respectively actual positions of physical antenna elements of the sparse uniform sub-surface array $\mathbb{P}_1$ in the x axial direction and y axial direction, and $$x_{\mathbb{P}_1}^{(1)} = 0, y_{\mathbb{P}_1}^{(1)} = 0, \mu_k = \sin(\varphi_k)\cos(\theta_k), v_k = \sin(\varphi_k)\sin(\theta_k), j = \sqrt{-1}.$$

Similarly, the received signals of the sparse uniform sub-surface array $\mathbb{P}_2$ can be expressed by three-dimensional tensor $$\mathcal{X}_{\mathbb{P}_2} \in \mathbb{C}^{N_x \times N_y \times T}$$

as follows:

$$X_{\mathbb{P}_2} = \sum_{k=1}^{K} a_x^{(\mathbb{P}_2)}(\theta_k, \varphi_k) \circ a_y^{(\mathbb{P}_2)}(\theta_k, \varphi_k) \circ s_k + N_{\mathbb{P}_2},$$

wherein $N_{\mathbb{P}_2}$ is a noise tensor independent of each signal source, $$a_x^{(\mathbb{P}_2)}(\theta_k, \varphi_k) \text{ and}$$
$$a_y^{(\mathbb{P}_2)}(\theta_k, \varphi_k)$$

are respectively steering vectors of $\mathbb{P}_2$ in an x axial direction and a y axial direction, correspond to a signal source with an incoming wave direction of $(\theta_k, \varphi_k)$, and are expressed as follows:

$$a_x^{(\mathbb{P}_2)}(\theta_k, \varphi_k) = \left[1, e^{-j\pi x_{\mathbb{P}_2}^{(2)} \mu_k}, \ldots, e^{-j\pi x_{\mathbb{P}_2}^{(N_x)} \mu_k}\right]^T,$$

$$a_y^{(\mathbb{P}_2)}(\theta_k, \varphi_k) = \left[1, e^{-j\pi y_{\mathbb{P}_2}^{(2)} v_k}, \ldots, e^{-j\pi y_{\mathbb{P}_2}^{(N_y)} v_k}\right]^T,$$

and wherein $$\left\{x_{\mathbb{P}_2}^{(1)}, x_{\mathbb{P}_2}^{(2)}, \ldots, x_{\mathbb{P}_2}^{(N_x)}\right\} 和 \left\{y_{\mathbb{P}_2}^{(1)}, y_{\mathbb{P}_2}^{(2)}, \ldots, y_{\mathbb{P}_2}^{(N_y)}\right\}$$

represent respectively actual positions of physical antenna elements of the sparse uniform sub-surface array $\mathbb{P}_2$ in the x axial direction and y axial direction, and $$x_{\mathbb{P}_2}^{(1)} = 0, \ y_{\mathbb{P}_2}^{(1)} = 0.$$

obtaining a second-order cross-correlation tensor $$R_{\mathbb{P}_1 \mathbb{P}_2} \in \mathbb{C}^{2M_x \times 2M_y \times N_x \times N_y}$$

by solving cross-correlation statistic of three-dimensional tensor signals $X_{\mathbb{P}_1}$ and $X_{\mathbb{P}_2}$:

$$R_{\mathbb{P}_1 \mathbb{P}_2} = E\left[\langle X_{\mathbb{P}_1}, X_{\mathbb{P}_2}^* \rangle_3\right]$$
$$= \sum_{k=1}^{K} \sigma_k^2 a_x^{(\mathbb{P}_1)}(\theta_k, \varphi_k) \circ a_y^{(\mathbb{P}_1)}(\theta_k, \varphi_k) \circ a_x^{(\mathbb{P}_2)^*}(\theta_k, \varphi_k) \circ a_y^{(\mathbb{P}_2)^*}(\theta_k, \varphi_k) +$$
$$N_{\mathbb{P}_1 \mathbb{P}_2}$$

wherein $\sigma_k^2 = E[s_k s_k^*]$ represents power of a kth incident signal source, $$N_{\mathbb{P}_1 \mathbb{P}_2} = E\left[\langle N_{\mathbb{P}_1}, N_{\mathbb{P}_2}^* \rangle_3\right]$$

represents the cross-correlation noise tensor, $\langle \bullet, \bullet \rangle_r$ represents a tensor contraction operation of the two tensors along a rth dimension, $E[\bullet]$ represents a mathematical expectation operation, and $(\bullet)^*$ represents a conjugation operation. Here, the cross-correlation noise tensor $N_{\mathbb{P}_1 \mathbb{P}_2}$ only has an element with a value $\sigma_n^2$ in the (1, 1, 1, 1)th position, wherein $\sigma_n^2$ represents the noise power, and elements in other positions have the same value 0. In practice, obtaining $R_{\mathbb{P}_1 \mathbb{P}_2}$ by calculating the cross-correlation statistic of the tensors $X_{\mathbb{P}_1}$ and $X_{\mathbb{P}_2}$ to approximate, that is, sampling cross-correlation tensor $$\hat{R}_{\mathbb{P}_1 \mathbb{P}_2} \in \mathbb{C}^{2M_x \times 2M_y \times N_x \times N_y}:$$

$$\hat{R}_{\mathbb{P}_1 \mathbb{P}_2} = \frac{1}{T} \langle X_{\mathbb{P}_1}, X_{\mathbb{P}_2}^* \rangle_3;$$

Figure 3:
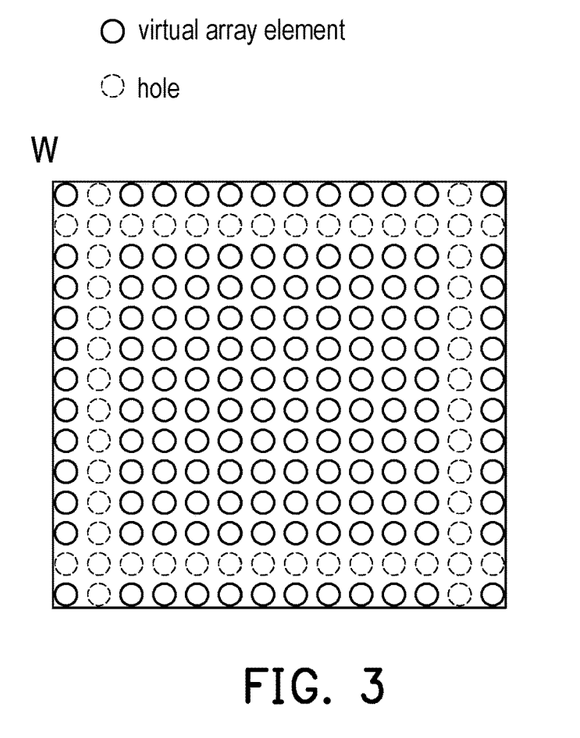
FIG. 3 is a schematic diagram of an augmented non-contiguous virtual surface array derived by the present invention.
Figure 4:
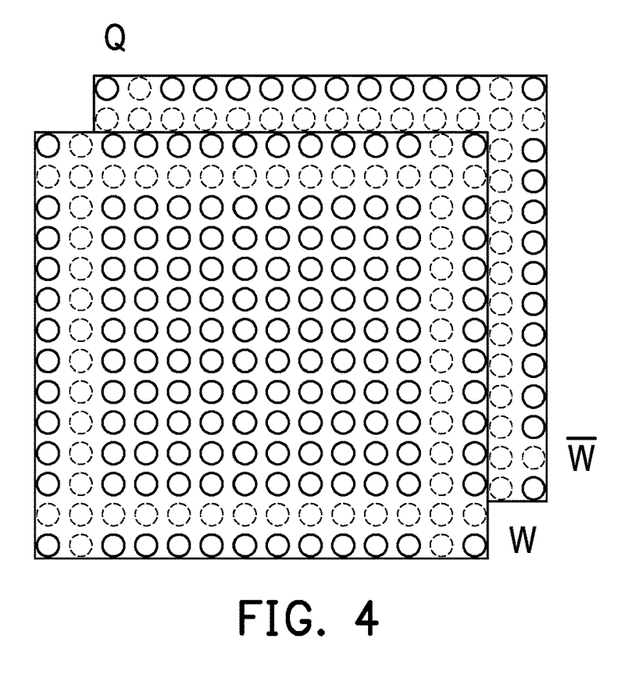
FIG. 4 is a schematic diagram of a non-contiguous virtual cubic array derived by the present invention.

Step 3: constructing an augmented non-continuous virtual surface array based on the cross-correlation tensor transformation of the coprime surface array. Since the cross-correlation tensor $R_{\mathbb{P}_1 \mathbb{P}_2}$ contains the spatial information corresponding to the two sparse uniform sub-surface arrays $\mathbb{P}_1$ and $\mathbb{P}_2$, by merging the dimensions representing the spatial information in the same direction in $R_{\mathbb{P}_1 \mathbb{P}_2}$, the steering vectors corresponding to the two sparse uniform sub-surface arrays can form a difference set array in the exponential term so as to construct a two-dimensional augmented virtual surface array. Specifically, the first and third dimensions of the cross-correlation tensor $R_{\mathbb{P}_1 \mathbb{P}_2}$ (represented by the steering vectors $$a_x^{(P_1)}(\theta_k, \varphi_k) \text{ and}$$
$$a_x^{(P_2)^*}(\theta_k, \varphi_k)$$

represent the spatial information of the x axial direction, and the second and fourth dimensions (represented by the steering vectors $$a_y^{(P_1)}(\theta_k, \varphi_k) a_y^{(P_2)^*} \text{ and}$$
$$(\theta_k, \varphi_k))$$

represent the spatial information of the y axial direction; for this reason, defining the dimension sets $J_1 = \{1, 3\}$, $J_2 = \{2, 4\}$, and obtaining a virtual domain signal $$U_W \in \mathbb{C}^{2M_x N_x \times 2M_y N_y}$$

by performing the tensor transformation of dimension merging on the cross-correlation tensor $R_{\mathbb{P}_1 \mathbb{P}_2}$:

$$U_W \triangleq R_{\mathbb{P}_1 \mathbb{P}_2 \{J_1, J_2\}} = \sum_{k=1}^{K} \sigma_k^2 b_x(k) \circ b_y(k),$$

wherein the $$b_x(k) = a_x^{(\mathbb{P}_2)^*}(\theta_k, \varphi_k) \otimes a_x^{(\mathbb{P}_1)}(\theta_k, \varphi_k) \text{ and } b_y(k) = a_y^{(\mathbb{P}_2)^*}(\theta_k, \varphi_k) \otimes a_y^{(\mathbb{P}_1)}(\theta_k, \varphi_k)$$

are equivalent to the steering vectors of the non-continuous virtual surface array W on the x axis and the y axis, which corresponds to the signal source with the incoming wave direction $(\theta_k, \varphi_k)$, and $\otimes$ represents the Kronecker product. The non-contiguous virtual surface array W has a size of $J_{W_x} \times J_{W_y}$, and contains the holes (that is, missing elements) in an entire row and an entire column, as shown in FIG. 3, $J_{W_x}=3M_xN_x-M_x-N_x+1$, $J_{W_y}=3M_yN_y-M_y-N_y+1$. Here, in order to simplify the derivation process, the cross-correlation noise tensor $N_{\mathbb{P}_1\mathbb{P}_2}$ is omitted in the theoretical modeling step of $U_W$. However, in practice, since the sampled cross-correlation tensor $\hat{R}_{\mathbb{P}_1\mathbb{P}_2}$ is used to replace the theoretical cross-correlation tensor $R_{\mathbb{P}_1\mathbb{P}_2}$, $N_{\mathbb{P}_1\mathbb{P}_2}$ is still contained in the statistical processing of virtual domain signals;

Step 4: deriving the virtual domain tensor based on the mirror expansion of the non-contiguous virtual surface array. Constructing a virtual surface array $\overline{W}$ mirroring the non-continuous virtual surface array W about the coordinate axis, and superimposing the W and $\overline{W}$ on the third dimension to form a three-dimensional non-continuous virtual cubic array $\mathbb{Q}$ of size $J_{\mathbb{Q}_x} \times J_{\mathbb{Q}_y} \times J_{\mathbb{Q}_z}$, as shown in FIG. 4. Here, $$J_{\mathbb{Q}_x} = J_{W_x}, J_{\mathbb{Q}_y} = J_{W_y} \text{ and}$$

$$J_{\mathbb{Q}_z} = 2.$$

Correspondingly, arranging the elements in the conjugate transposed signal $U_W^*$ of the virtual domain signal $U_W$ to correspond to the positions of the virtual array elements in $\overline{W}$, so that the virtual domain signal $U_{\overline{W}}$ corresponding to the virtual surface array $\overline{W}$ can be obtained; and superimposing the $U_W$ and $U_{\overline{W}}$ on the third dimension, so as to obtain the virtual domain tensor $U_{\mathbb{Q}}$ corresponding to the non-contiguous virtual cubic array $\mathbb{Q}$, which is expressed as:

$$U_{\mathbb{Q}} = \sum_{k=1}^{K} \sigma_k^2 \tilde{b}_x(k) \circ \tilde{b}_y(k) \circ c_k,$$

wherein $\tilde{b}_x(k)$ and $\tilde{b}_y(k)$ are respectively steering vectors of the non-continuous virtual cubic array $\mathbb{Q}$ on the x axis and the y axis, and correspond to the signal source with an incoming wave direction $(\theta_k, \varphi_k)$; due to existence of the missing elements (holes) in $\mathbb{Q}$, $\tilde{b}_x(k)$ and $\tilde{b}_y(k)$ respectively correspond to elements in the hole positions in $\mathbb{Q}$ in the x axial and y axial directions which are set to be zero, $$c_k = \left[1, e^{-j\pi\left(-(M_xM_y+M_x+M_y)\mu_k-(N_xN_y+N_x+N_y)\nu_k\right)}\right]^T$$

represents a mirror transformation factor vector corresponding to W and $\overline{W}$; since the non-continuous virtual surface array W contains the holes in the entire row and the entire column, the non-continuous virtual cubic array $\mathbb{Q}$ obtained by superimposing W with a mirror image part thereof $\overline{W}$ contains contiguous holes, corresponds to virtual field tensor $U_{\mathbb{Q}}$ of the non-continuous virtual cubic array $\mathbb{Q}$, and thus contains contiguous missing elements;

Step 5: dispersing contiguous missing elements thereof by virtual domain tensor reconstruction. In order to construct a virtual uniform cubic array to realize the Nyquist matched signal processing, it is necessary to fill the contiguous missing elements in the virtual domain tensor $U_{\mathbb{Q}}$, so as to correspond to a virtual uniform cubic array $\mathbb{Q}$. However, the low-rank tensor filling technique is premised on the random distribution of missing elements in the tensor, and cannot effectively fill the virtual domain tensor $U_{\mathbb{Q}}$ with contiguous missing elements. For this reason, dispersing contiguous missing elements thereof by reconstructing virtual domain tensor $U_{\mathbb{Q}}$. Specifically, designing a translation window of size $P_x \times P_y \times 2$ to select a sub-tensor $U_{\mathbb{Q}(1,1)}$ of the virtual domain tensor $U_{\mathbb{Q}}$, which contains elements of which indices are $(1: P_x-1)$, $(1: P_y-1)$ and $(1:2)$ respectively in three dimensions of $U_{\mathbb{Q}}$; then, translating the translation window by one element in turn along the x axial direction and the y axial direction, and dividing $U_{\mathbb{Q}}$ into $L_x \times L_y$ sub-tensors, expressed as $$U_{\mathbb{Q}(s_x, s_y)}, s_x = 1, 2, \ldots, L_x, s_y = 1, 2, \ldots, L_y.$$

A value range of the translation window size is as follows:

$$2 \leq P_x \leq J_{\mathbb{Q}_x} - 1,$$

$$2 \leq P_y \leq J_{\mathbb{Q}_y} - 1,$$

and $L_x$, $L_y$, $P_x$, $P_y$ satisfy the following relationship:

$$P_x + L_x - 1 = J_{\mathbb{Q}_x},$$

$$P_y + L_y - 1 = J_{\mathbb{Q}_y},$$

Superimposing the sub-tensors $U_{\mathbb{Q}(s_x, s_y)}$ with the same index subscript $s_y$ in the fourth dimension to obtain $L_y$ four-dimensional tensors with $P_x \times P_y \times 2 \times L_x$ dimensions; further, superimposing the $L_y$ four-dimensional tensors in a fifth dimension to obtain a five-dimensional virtual domain tensor $$T_{\mathbb{Q}} \in \mathbb{C}^{P_x \times P_y \times 2 \times L_x \times L_y},$$

wherein the five-dimensional virtual domain tensor $T_{\mathbb{Q}}$ contains spatial angle information in the x axial direction and y axial direction, spatial mirror transformation information, and spatial translation information in the x axial direction and the y axial direction; and, merging $T_{\mathbb{Q}}$ along the first and second dimensions representing the spatial angle information, and at the same time merging it along the fourth and fifth dimensions representing the spatial translation information, and retaining the third dimension representing the spatial mirror transformation information. Specifically, defining the dimension sets $K_1=\{1,2\}$, $K_2=\{3\}$, $K_3=\{4,5\}$ and merging through the dimensions of $T_\mathbb{Q}$ to obtain a three-dimensional reconstructed virtual domain tensor $$K_\mathbb{Q} \in \mathbb{C}^{P_xP_y \times L_xL_y \times 2};$$

$$K_\mathbb{Q} \triangleq T_{\mathbb{Q}_{\{K_1,K_2,K_3\}}},$$

wherein the three dimensions of $K_\mathbb{Q}$ respectively represent the spatial angle information, the spatial translation information and the spatial mirror transformation information, thus, the contiguous missing elements in the virtual domain tensor $U_\mathbb{Q}$ are randomly distributed to the three spatial dimensions contained in $K_\mathbb{Q}$;

Step 6: performing virtual domain tensor filling based on tensor kernel norm minimization. In order to fill the reconstructed virtual domain tensor $K_\mathbb{Q}$, designing a virtual domain tensor filling optimization problem based on tensor kernel norm minimization as follows:

$$\min_{\overline{K}_\mathbb{Q}} \|\overline{K}_\mathbb{Q}\|_*$$

$$\text{s.t. } P_{\overline{\Omega}}(\overline{K}_\mathbb{Q}) = P_{\overline{\Omega}}(K_\mathbb{Q}),$$

wherein the optimization variable $$\overline{K}_\mathbb{Q} \in \mathbb{C}^{P_xP_y \times L_xL_y \times 2}$$

is the filled virtual domain tensor, corresponding to the virtual uniform cubic array $\overline{\mathbb{Q}}$, $\|\cdot\|_*$ represents the tensor kernel norm, $\overline{\Omega}$ represents a position index set of the non-missing elements in $K_\mathbb{Q}$, $P_{\overline{\Omega}}(\cdot)$ represents the mapping of the tensor on $\overline{\Omega}$. Since the kernel norm is a convex function, the virtual domain tensor filling problem based on the minimization of the tensor kernel norm is a solvable convex optimization problem. The convex optimization problem is solved to obtain $\overline{K}_\mathbb{Q}$;

Step 7: decomposing the filled virtual domain tensor to obtain the direction-of-arrival estimation result. Expressing the filled virtual domain tensor $\overline{K}_\mathbb{Q}$ as follows:

$$\overline{K}_\mathbb{Q} = \sum_{k=1}^{K} \sigma_k^2 p_k \circ q_k \circ c_k,$$

wherein $p_k = d_y(k) \otimes d_x(k)$, $q_k = g_y(k) \otimes g_x(k)$ are the space factors of $\overline{K}_\mathbb{Q}$, $d_x(k) = \left[e^{-j\pi(-M_xN_x+M_x)\mu_k}, e^{-j\pi(-M_xN_x+M_x+1)\mu_k}, \ldots, e^{-j\pi(2M_xN_x-N_x)\mu_k}\right]^T,$ $d_y(k) = \left[e^{-j\pi(-M_yN_y+M_y)\nu_k}, e^{-j\pi(-M_yN_y+M_y+1)\nu_k}, \ldots, e^{-j\pi(2M_yN_y-N_y)\nu_k}\right]^T,$ respectively represent the steering vectors of the virtual uniform cubic array $\overline{\mathbb{Q}}$ along the x axial direction and y axial directions, $$g_x(k) = \left[1, e^{-j\pi\mu_k}, \ldots, e^{-j\pi(L_x-1)\mu_k}\right]^T,$$

$$g_y(k) = \left[1, e^{-j\pi\nu_k}, \ldots, e^{-j\pi(L_y-1)\nu_k}\right]^T,$$

are respectively the spatial translation factor vectors corresponding to the x axial direction and y axial direction in the process of intercepting the sub-tensor by the translation window. Performing the canonical polyadic decomposition on the filled virtual domain tensor $\overline{K}_\mathbb{Q}$ to obtain estimated values of the factor vectors $p_k$, $q_k$ and $c_k$, which are represented as $\hat{p}_k$, $\hat{q}_k$ and $\hat{c}_k$, and, then extracting the parameters $\hat{\mu}_k=\sin(\hat{\varphi}_k)\cos(\hat{\theta}_k)$ and $\hat{\nu}_k=\sin(\hat{\varphi}_k)\sin(\hat{\theta}_k)$ from $\hat{p}_k$ and $\hat{q}_k$ as follows:

$$\hat{\mu}_k = \left(\angle\left(\frac{\hat{p}_{k_{(\eta_1+1)}}}{\hat{p}_{k_{(\eta_1)}}}\right) + \angle\left(\frac{\hat{q}_{k_{(\eta_2+1)}}}{\hat{q}_{k_{(\eta_2)}}}\right)\right)/2\pi,$$

$$\hat{\nu}_k = \left(\angle\left(\frac{\hat{p}_{k_{(P_x+\delta_1)}}}{\hat{p}_{k_{(\delta_1)}}}\right) + \angle\left(\frac{\hat{q}_{k_{(P_y+\delta_2)}}}{\hat{q}_{k_{(\delta_2)}}}\right)\right)/2\pi,$$

wherein $\angle(\bullet)$ represents the operation of taking the argument of a complex number, and $a_{(a)}$ represents the ath element of a vector a; here, according to the Kronecker structure of $\hat{p}_k$ and $\hat{q}_k$, $\eta_1 \in [1, P_xP_y-1]$ and $\eta_2 \in [1, L_xL_y-1]$ respectively satisfy $\text{mod}(\eta_1, P_x) \neq 0$ and $\text{mod}(\eta_2, P_y) \neq 0$, and $\delta_1 \in [1, P_xP_y-P_x]$, $\delta_2 \in [1, L_xL_y \times L_x]$, $\text{mod}(\bullet)$ represents the operation of taking a remainder. According to the relationship between the parameter $(\mu_k, \nu_k)$ and the two-dimensional direction-of-arrival $(\theta_k, \varphi_k)$, obtaining a closed-form solution of the two-dimensional direction-of-arrival estimation $(\hat{\theta}_k, \hat{\varphi}_k)$ as follows:

$$\hat{\theta}_k = \arctan\left(\frac{\hat{\nu}_k}{\hat{\mu}_k}\right),$$

$$\hat{\varphi}_k = \sqrt{\hat{\nu}_k^2 + \hat{\mu}_k^2}.$$

The effect of the present invention will be further described below in conjunction with a simulation example.

Simulation example: the coprime array is used to receive an incident signal, and its parameters are selected as $M_x=2$, $M_y=3$, $N_x=3$, $N_y=4$, that is, the constructed coprime surface array contains $4M_xM_y+N_xN_y-1=35$ physical array elements. The translation window size of the sub-tensor is $6\times15\times2$. Assuming that there are 2 narrowband incident signals, the azimuth and elevation angles of the incident direction are respectively [30.6°, 25.6°] and [40.5°, 50.5°]. Comparing the two-dimensional direction-of-arrival estimation method of coprime surface array based on virtual domain tensor filling proposed by the present invention with the traditional Multiple Signal Classification (MUSIC) method and Tensor Multiple Signal Classification (Tensor MUSIC) method which only utilize the contiguous part of the virtual domain, under the condition of the number of sampling snapshots T=300, plotting performance comparison curves of Root Mean Square Error (RMSE) as a function of signal-to-noise ratio (SNR), as shown in FIG. 5; under the condition of SNR=0 dB, plotting performance comparison curves of RMSE as a function of the number of sampling snapshots T, as shown in FIG. 6.

Figure 5:
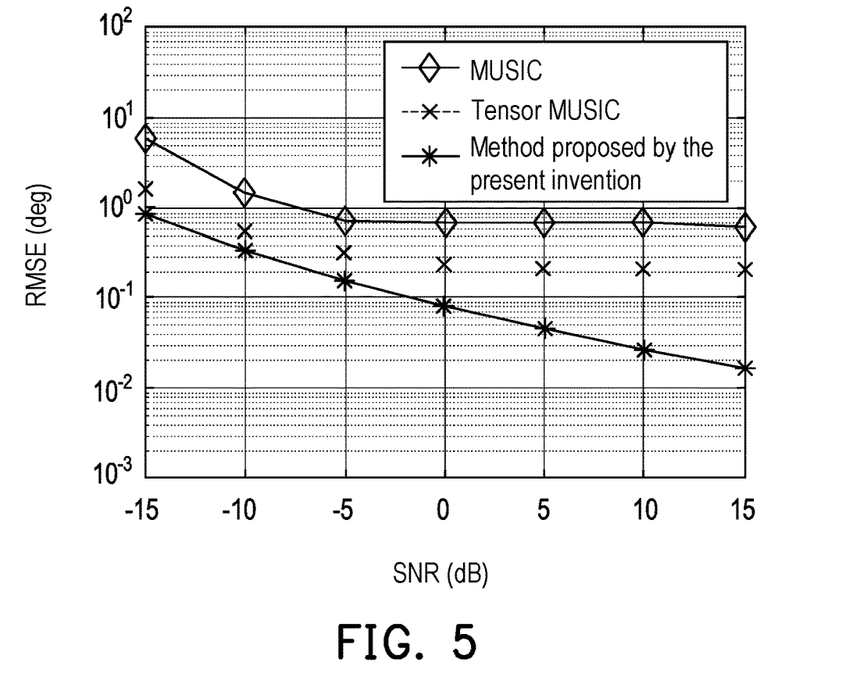
FIG. 5 is a performance comparison diagram of the direction-of-arrival estimation accuracy of the method proposed in the present invention under different signal-to-noise ratio conditions.
Figure 6:
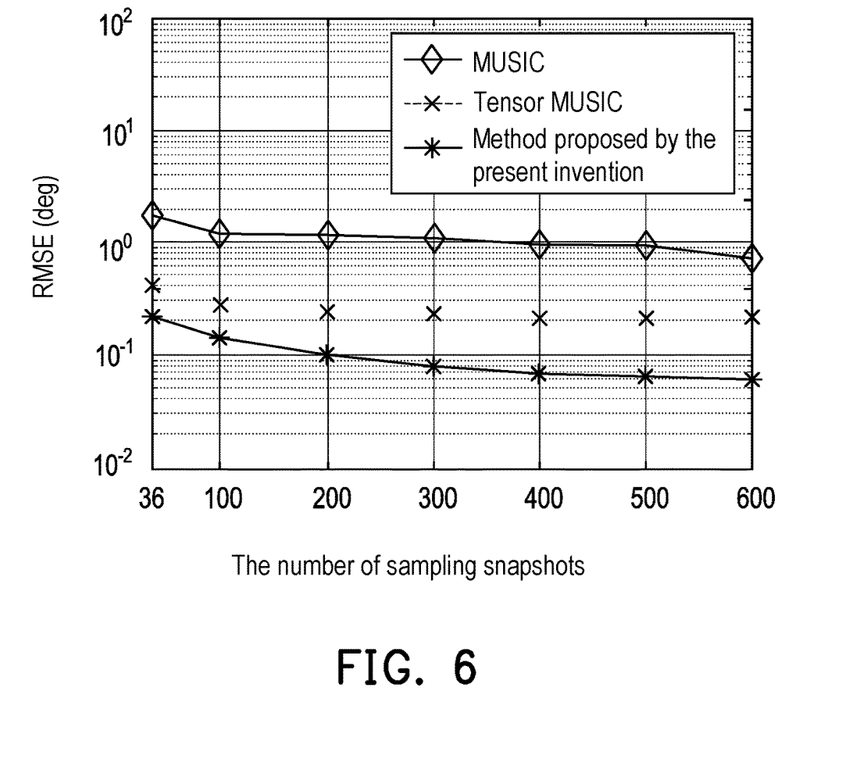
FIG. 6 is a performance comparison diagram of the direction-of-arrival estimation accuracy of the method proposed in the present invention under different sampling snapshot numbers.

It can be seen from the comparison results of FIG. 5 and FIG. 6 that no matter in different expected signal-to-noise ratio (SNR) scenarios or in different numbers of the sampling snapshots T scenarios, the method proposed in the present invention has a performance advantage in the direction-of-arrival estimation accuracy. Compared with the traditional MUSIC method, the method proposed in the present invention makes full use of the structural information of the received signal of the coprime surface array by constructing the virtual domain tensor, so as to have better performance of direction-of-arrival estimation; and, compared with the Tensor MUSIC method, the performance advantage of the method proposed in the present invention comes from the use of all non-contiguous virtual domain statistics information through the virtual domain tensor filling, while the Tensor MUSIC method only extracts the continuous part of the non-contiguous virtual array for the virtual domain signal processing, resulting in loss of the virtual domain statistics information.

In summary, the present invention realizes the random distribution of the contiguous missing elements through the virtual domain tensor reconstruction, and based on this, designs the virtual domain tensor filling method based on the tensor kernel norm minimization, and successfully utilizes all the non-continuous virtual domain statistics information, which realizes the high-precision two-dimensional direction-of-arrival estimation of the coprime surface array.

The above descriptions are only preferred embodiments of the present invention. Although the present invention has been disclosed above with preferred embodiments, they are not intended to limit the present invention. Any person skilled in the art, without departing from the scope of the technical solution of the present invention, can make many possible changes and modifications to the technical solution of the present invention by using the methods and technical contents disclosed above, or modify the technical solution of the present invention into equivalent examples. Therefore, any simple modification, equivalent change and modification made to the above embodiments according to the technical essence of the present invention without departing from the contents of the technical solution of the present invention still falls within the protection scope of the technical solution of the present invention.

What is claimed is:

1. A two-dimensional direction-of-arrival estimation method for a coprime surface array based on virtual domain tensor filling, wherein the method comprises the following steps:
   (1) configuring a receiving end with a coprime surface array by using $4M_xM_y+N_xN_y-1$ physical antenna array elements, wherein $M_x$, $N_x$ and $M_y$, $N_y$ are a pair of coprime integers respectively; decomposing the coprime surface array into two sparse uniform sub-surface arrays $\mathbb{P}_1$ and $\mathbb{P}_2$, wherein $\mathbb{P}_1$ contains $2M_x \times 2M_y$ antenna array elements, array element spacings in an x axial direction and a y axial direction are respectively $N_x d$ and $N_y d$, $\mathbb{P}_2$ includes $N_x \times N_y$ antenna array elements, array element spacings in the x axial direction and the y axial direction are respectively $M_x d$ and $M_y d$, and an unit interval d is taken as half of wavelength $\lambda$ of an incident narrowband signal;
   (2) if there are K far-field narrowband uncorrelated signal sources from $\{(\theta_1, \varphi_1), (\theta_2, \varphi_2), \ldots, (\theta_K, \varphi_K)\}$ directions, $\theta_k$ and $\varphi_k$ are respectively an azimuth angle and an elevation angle of a kth incident signal source, k=1, 2, ..., K, utilizing a three-dimensional tensor $$X_{\mathbb{P}_1} \in \mathbb{C}^{2M_x \times 2M_y \times T}$$

to express T sampling snapshot signals of a sparse uniform sub-surface array $\mathbb{P}_1$ as follows:

$$X_{\mathbb{P}_1} = \sum_{k=1}^{K} a_x^{(\mathbb{P}_1)}(\theta_k, \varphi_k) \circ a_y^{(\mathbb{P}_1)}(\theta_k, \varphi_k) \circ s_k + N_{\mathbb{P}_1},$$

wherein $s_k = [s_{k,1}, s_{k,2}, \ldots, s_{k,T}]^T$ is a multi-snapshot sampling signal waveform corresponding to the kth incident signal source, $[\cdot]^T$ represents a transpose operation, $\circ$ represents an outer product of a vector, $N_{\mathbb{P}_1}$ is a noise tensor independent of each signal source, $$a_x^{(\mathbb{P}_1)}(\theta_k, \varphi_k) \text{ and } a_y^{(\mathbb{P}_1)}(\theta_k, \varphi_k)$$

are respectively steering vectors of $\mathbb{P}_1$ in the x axial direction and the y axial direction, correspond to a signal source with an incoming wave direction of $(\theta_k, \varphi_k)$, and are expressed as follows:

$$a_x^{(\mathbb{P}_1)}(\theta_k, \varphi_k) = \left[1, e^{-j\pi x_{\mathbb{P}_1}^{(2)} \mu_k}, \ldots, e^{-j\pi x_{\mathbb{P}_1}^{(2M_x)} \mu_k}\right]^T,$$

$$a_y^{(\mathbb{P}_1)}(\theta_k, \varphi_k) = \left[1, e^{-j\pi y_{\mathbb{P}_1}^{(2)} v_k}, \ldots, e^{-j\pi y_{\mathbb{P}_1}^{(2M_y)} v_k}\right]^T,$$

and wherein $$\left\{x_{\mathbb{P}_1}^{(1)}, x_{\mathbb{P}_1}^{(2)}, \ldots, x_{\mathbb{P}_1}^{(2M_x)}\right\} 和 \left\{y_{\mathbb{P}_1}^{(1)}, y_{\mathbb{P}_1}^{(2)}, \ldots, y_{\mathbb{P}_1}^{(2M_y)}\right\}$$

represent respectively actual positions of physical antenna elements of the sparse uniform sub-surface array $\mathbb{P}_1$ in the x axial direction and the y axial direction, and $$x_{\mathbb{P}_1}^{(1)} = 0, y_{\mathbb{P}_1}^{(1)} = 0, \mu_k = \sin(\varphi_k)\cos(\theta_k), v_k = \sin(\varphi_k)\sin(\theta_k), j = \sqrt{-1};$$

expressing the T sampled snapshot signals of the sparse uniform sub-surface array $\mathbb{P}_2$ by another three-dimensional tensor $$X_{\mathbb{P}_2} \in \mathbb{C}^{N_x \times N_y \times T}$$

as follows:

$$X_{\mathbb{P}_2} = \sum_{k=1}^{K} a_x^{(\mathbb{P}_2)}(\theta_k, \varphi_k) \circ a_y^{(\mathbb{P}_2)}(\theta_k, \varphi_k) \circ s_k + N_{\mathbb{P}_2},$$

wherein $N_{\mathbb{P}_2}$ is a noise tensor independent of each signal source, $$a_x^{(\mathbb{P}_2)}(\theta_k, \varphi_k) \text{ and } a_y^{(\mathbb{P}_2)}(\theta_k, \varphi_k)$$

are respectively steering vectors of $\mathbb{P}_2$ in the x axial direction and the y axial direction, correspond to a signal source with an incoming wave direction of $(\theta_k, \varphi_k)$, and are expressed as follows:

$$a_x^{(\mathbb{P}_2)}(\theta_k, \varphi_k) = \left[1, e^{-j\pi x_{\mathbb{P}_2}^{(2)} \mu_k}, \ldots, e^{-j\pi x_{\mathbb{P}_2}^{(N_x)} \mu_k}\right]^T,$$

$$a_y^{(\mathbb{P}_2)}(\theta_k, \varphi_k) = \left[1, e^{-j\pi y_{\mathbb{P}_2}^{(2)} v_k}, \ldots, e^{-j\pi y_{\mathbb{P}_2}^{(N_y)} v_k}\right]^T,$$

and wherein $$\left\{x_{\mathbb{P}_2}^{(1)}, x_{\mathbb{P}_2}^{(2)}, \ldots, x_{\mathbb{P}_2}^{(N_x)}\right\} \text{ 和 } \left\{y_{\mathbb{P}_2}^{(1)}, y_{\mathbb{P}_2}^{(2)}, \ldots, y_{\mathbb{P}_2}^{(N_y)}\right\}$$

represent respectively actual positions of physical antenna elements of the sparse uniform sub-surface array $\mathbb{P}_1$ in the x axial direction and the y axial direction, and $$x_{\mathbb{P}_2}^{(1)} = 0, \quad y_{\mathbb{P}_2}^{(1)} = 0;$$

obtaining a second-order cross-correlation tensor $$R_{\mathbb{P}_1 \mathbb{P}_2} \in \mathbb{C}^{2M_x \times 2M_y \times N_x \times N_y}$$

by solving cross-correlation statistic of the three-dimensional tensors $X_{\mathbb{P}_1}$ and $X_{\mathbb{P}_2}$:

$$R_{\mathbb{P}_1 \mathbb{P}_2} = E\left[\langle X_{\mathbb{P}_1}, X_{\mathbb{P}_2}^* \rangle_3\right]$$
$$= \sum_{k=1}^{K} \sigma_k^2 a_x^{(\mathbb{P}_1)}(\theta_k, \varphi_k) \circ a_y^{(\mathbb{P}_1)}(\theta_k, \varphi_k) \circ a_x^{(\mathbb{P}_2)*}(\theta_k, \varphi_k) \circ a_y^{(\mathbb{P}_2)*}(\theta_k, \varphi_k) +$$
$$N_{\mathbb{P}_1 \mathbb{P}_2}$$

wherein $\sigma_k^2 = E[s_k s_k^*]$ represents power of a kth incident signal source, $$N_{\mathbb{P}_1 \mathbb{P}_2} = E\left[\langle N_{\mathbb{P}_1}, N_{\mathbb{P}_2}^* \rangle_3\right]$$

represents a cross-correlation noise tensor, $\langle \bullet, \bullet \rangle_r$ represents a tensor contraction operation of two tensors along a rth dimension, $E[\bullet]$ represents a mathematical expectation operation, and $(\bullet)^*$ represents a conjugation operation; the cross-correlation noise tensor $N_{\mathbb{P}_1 \mathbb{P}_2}$ only has an element with a value $\sigma_n^2$ in the (1, 1, 1, 1)th position, wherein $\sigma_n^2$ represents a noise power, and elements in other positions have the same value 0;

(3) defining dimension sets $J_1=\{1,3\}$, $J_2=\{2,4\}$, and obtaining a virtual domain signal $$U_W \in \mathbb{C}^{2M_x N_x \times 2M_y N_y}$$

by performing a tensor transformation of dimension merging on the cross-correlation tensor $R_{\mathbb{P}_1 \mathbb{P}_2}$:

$$U_W \triangleq R_{\mathbb{P}_1 \mathbb{P}_2 \{J_1, J_2\}} = \sum_{k=1}^{K} \sigma_k^2 b_x(k) \circ b_y(k),$$

wherein by respectively forming a difference set array on an exponential term, $$b_x(k) = $$
$$a_x^{(\mathbb{P}_2)*}(\theta_k, \varphi_k) \otimes a_x^{(\mathbb{P}_1)}(\theta_k, \varphi_k) \text{ and } b_y(k) = a_y^{(\mathbb{P}_2)*}(\theta_k, \varphi_k) \otimes a_y^{(\mathbb{P}_1)}(\theta_k, \varphi_k)$$

configure a two-dimensional augmented virtual surface array along the x axial direction and the y axial direction, $\otimes$ represents a Kronecker product; therefore, $U_W$ corresponds to a non-continuous virtual surface array W of size $J_{W_x} \times J_{W_y}$, $J_{W_x}=3M_xN_x-M_x-N_x+1$, $J_{W_y}=3M_yN_y-M_y-N_y+1$, and the non-continuous virtual surface array W contains holes in an entire row and an entire column;

(4) configuring a virtual surface array $\overline{W}$ that mirrors the non-continuous virtual surface array W about a coordinate axis, and superimposing the W and $\overline{W}$ on a third dimension into a three-dimensional non-continuous virtual cubic array $\mathbb{Q}$ of size $J_{\mathbb{Q}_x} \times J_{\mathbb{Q}_y} \times J_{\mathbb{Q}_z}$, wherein $J_{\mathbb{Q}_x} = J_{W_x}$, $J_{\mathbb{Q}_y} = J_{W_y}$ and $J_{\mathbb{Q}_z} = 2$;

correspondingly, rearranging elements in a conjugate transposed signal $U_W^*$ of the virtual domain signal $U_W$ to correspond to positions of virtual array elements in $\overline{W}$, so as to obtain a virtual domain signal $U_{\overline{W}}$ corresponding to the virtual surface array $\overline{W}$; superimposing $U_W$ and $U_{\overline{W}}$ in the third dimension to obtain a virtual domain tensor $U_{\mathbb{Q}}$ corresponding to the non-continuous virtual cubic array $\mathbb{Q}$, which is represented as:

$$U_{\mathbb{Q}} = \sum_{k=1}^{K} \sigma_k^2 \tilde{b}_x \circ \tilde{b}_y(k) \circ c_k,$$

wherein $\tilde{b}_x(k)$ and $\tilde{b}_y(k)$ are respectively steering vectors of the non-continuous virtual cubic array $\mathbb{Q}$ on the x axial direction and the y axial direction, and correspond to the signal source with the incoming wave direction $(\theta_k, \varphi_k)$; due to existence of the holes in $\mathbb{Q}$, $\tilde{b}_x(k)$ and $\tilde{b}_y(k)$ respectively correspond to elements in hole positions in $\mathbb{Q}$ in the x axial direction and the y axial direction which are set to be zero, $$c_k = \left[1, e^{-j\pi\left(-(M_xM_y+M_x+M_y)\mu_k-(N_xN_y+N_x+N_y)\nu_k\right)}\right]^T \quad 5$$

represents a mirror transformation factor vector corresponding to W and $\overline{W}$; since the non-continuous virtual surface array W contains the holes in the entire row and the entire column, the non-continuous virtual cubic array $\mathbb{Q}$ obtained by superimposing W with a mirror image part thereof $\overline{W}$ contains contiguous holes, corresponds to virtual field tensor $U_\mathbb{Q}$ of the non-continuous virtual cubic array $\mathbb{Q}$, and thus contains contiguous missing elements;

(5) designing a translation window of size $P_x \times P_y \times 2$ to select a sub-tensor $U_{\mathbb{Q}(1,1)}$ of the virtual domain tensor $U_\mathbb{Q}$, wherein $U_{\mathbb{Q}(1,1)}$ contains elements of which indices are $(1: P_x-1)$, $(1: P_y-1)$ and $(1:2)$ respectively in three dimensions of $U_\mathbb{Q}$; then, translating the translation window by one element in turn along the x axial direction and the y axial direction, dividing $U_\mathbb{Q}$ into $L_x \times L_y$ sub-tensors, expressed as $U_{\mathbb{Q}(s_x, s_y)}$, $s_x=1, 2, \ldots, L_x$, $s_y=1, 2, \ldots, L_y$, wherein a value range of a size of the translation window is as follows:

$$2 \leq P_x \leq J_{\mathbb{Q}_x} - 1,$$
$$2 \leq P_y \leq J_{\mathbb{Q}_y} - 1,$$

and $L_x$, $L_y$, $P_x$, $P_y$ satisfy the following relationship:

$$P_x + L_x - 1 = J_{\mathbb{Q}_x},$$
$$P_y + L_y - 1 = J_{\mathbb{Q}_y},$$

superimposing the sub-tensors $U_{\mathbb{Q}(s_x, s_y)}$ with the same index subscript $s_y$ in a fourth dimension to obtain $L_y$ four-dimensional tensors with $P_x \times P_y \times 2 \times L_x$ dimensions; further, superimposing the $L_y$ four-dimensional tensors in a fifth dimension to obtain a five-dimensional virtual domain tensor $$T_\mathbb{Q} \in \mathbb{C}^{P_x \times P_y \times 2 \times L_x \times L_y},$$

wherein the five-dimensional virtual domain tensor $T_\mathbb{Q}$ contains spatial angle information in the x axial direction and the y axial direction, spatial mirror transformation information, and spatial translation information in the x axial direction and the y axial direction; defining dimension sets $K_1=\{1, 2\}$, $K_2=\{3\}$, $K_3=\{4, 5\}$, and merging through the dimensions of $T_\mathbb{Q}$ to obtain a three-dimensional reconfigured virtual domain tensor $$K_\mathbb{Q} \in \mathbb{C}^{P_xP_y \times L_xL_y \times 2};$$

$$K_\mathbb{Q} \triangleq T_{\mathbb{Q}_{\{K_1, K_2, K_3\}}}$$

wherein the three dimensions of $K_\mathbb{Q}$ respectively represent the spatial angle information, the spatial translation information and the spatial mirror transformation information, thus, the contiguous missing elements in the original virtual domain tensor $U_\mathbb{Q}$ are randomly distributed to the three spatial dimensions contained in $K_\mathbb{Q}$;

(6) designing a virtual domain tensor filling optimization problem based on tensor kernel norm minimization:

$$\min_{\overline{K}_\mathbb{Q}} \|\overline{K}_\mathbb{Q}\|_*$$
$$\text{s.t. } P_{\overline{\Omega}}(\overline{K}_\mathbb{Q}) = P_{\overline{\Omega}}(K_\mathbb{Q}),$$

wherein optimization variable $$\overline{K}_\mathbb{Q} \in \mathbb{C}^{P_xP_y \times L_xL_y \times 2}$$

is a filled virtual domain tensor corresponding to the virtual uniform cubic array $\overline{\mathbb{Q}}$, $\|\bullet\|_*$ represents a tensor kernel norm, $\overline{\Omega}$ represents a position index set of non-missing elements in $K_\mathbb{Q}$, $P_{\overline{\Omega}}(\bullet)$ represents a mapping of a tensor on $\overline{\Omega}$, wherein the virtual domain tensor filling optimization problem is solved to obtain $\overline{K}_{\overline{\mathbb{Q}}}$;

(7) expressing the filled virtual domain tensor $\overline{K}_{\overline{\mathbb{Q}}}$ as follows:

$$\overline{K}_{\overline{\mathbb{Q}}} = \sum_{k=1}^{K} \sigma_k^2 p_k \circ q_k \circ c_k,$$

wherein $p_k = d_y(k) \otimes d_x(k)$, $q_k = g_y(k) \otimes g_x(k)$ are the space factors of $\overline{K}_{\overline{\mathbb{Q}}}$, $$d_x(k) = \left[e^{-j\pi(-M_xN_x+M_x)\mu_k}, e^{-j\pi(-M_xN_x+M_x+1)\mu_k}, \ldots, e^{-j\pi(2M_xN_x-N_x)\mu_k}\right]^T,$$
$$d_y(k) = \left[e^{-j\pi(-M_yN_y+M_y)\nu_k}, e^{-j\pi(-M_yN_y+M_y+1)\nu_k}, \ldots, e^{-j\pi(2M_yN_y-N_y)\nu_k}\right]^T,$$

respectively represent steering vectors of the virtual uniform cubic array $\overline{\mathbb{Q}}$ along the x axial direction and the y axial directions, $$g_x(k) = \left[1, e^{-j\pi\mu_k}, \ldots, e^{-j\pi(L_x-1)\mu_k}\right]^T,$$
$$g_y(k) = \left[1, e^{-j\pi\nu_k}, \ldots, e^{-j\pi(L_y-1)\nu_k}\right]^T,$$

are respectively spatial translation factor vectors corresponding to the x axial direction and the y axial direction in a process of intercepting the sub-tensor by the translation window; performing canonical polyadic decomposition on the filled virtual domain tensor $\overline{K}_{\overline{\mathbb{Q}}}$ to obtain an estimated values of three factor vectors $p_k$, $q_k$ and $c_k$, which are expressed as $\hat{p}_k$, $\hat{q}_k$ and $\hat{c}_k$; and extracting angle parameters contained in exponential terms of $\hat{p}_k$ and $\hat{q}_k$ to obtain a two-dimensional direction-of-arrival estimation result ($\hat{\theta}k$, $\hat{\varphi}_k$), wherein the receiving end with the coprime surface array steers, based on the two-dimensional direction-of-arrival estimation result ($\hat{\theta}_k$, $\hat{\varphi}k$), vectors corresponding to the signal source with the incoming wave direction ($\theta_k$, $\varphi_k$).

2. The two-dimensional direction-of-arrival estimation method for a coprime surface array based on virtual domain tensor filling according to claim 1, wherein the coprime surface array structure described in the step (1) is specifically described as follows: configuring a pair of sparse uniform sub-surface arrays $\mathbb{P}_1$ and $\mathbb{P}_2$ in a plane coordinate system xoy, wherein $\mathbb{P}_1$ contains $2M_x \times 2M_y$ antenna elements, and the array element spacings in the x axial direction and the y axial direction are respectively $N_x d$ and $N_y d$, and position coordinate thereof on xoy is $\{(N_x dm_x, N_y dm_y), m_x=0, 1, \ldots, 2M_x-1, m_y=0, 1, \ldots, 2M_y-1\}$; $\mathbb{P}_2$ contains $N_x \times N_y$ antenna array elements, the array element spacings in the x axial direction and the y axial direction are respectively $M_x d$ and $M_y d$, and position coordinate thereof on xoy is $\{(M_x dn_x, M_y dn_y), n_x=0, 1, \ldots, N_x-1, n_y=0, 1, \ldots, N_y-1\}$; $M_x$ and $N_x$, and $M_y$ and $N_y$ are respectively a pair of coprime integers; and combining the sub-arrays of $\mathbb{P}_1$ and $\mathbb{P}_2$ in the way that the array elements at (0, 0) position in the coordinate system overlap to obtain a coprime surface array that actually contains $4M_x M_y + N_x N_y - 1$ physical antenna array elements.

3. The two-dimensional direction-of-arrival estimation method for a coprime surface array based on virtual domain tensor filling according to claim 1, wherein for the cross-correlation tensor derivation described in the step (2), obtaining $R_{\mathbb{P}_1 \mathbb{P}_2}$ by calculating the cross-correlation statistic of the tensors $X_{\mathbb{P}_1}$ and $X_{\mathbb{P}_2}$ to approximate, that is, sampling cross-correlation tensor $$\hat{R}_{\mathbb{P}_1 \mathbb{P}_2} \in \mathbb{C}^{2M_x \times 2M_y \times N_x \times N_y};$$

$$\hat{R}_{\mathbb{P}_1 \mathbb{P}_2} = \frac{1}{T} <X_{\mathbb{P}_1}, X_{\mathbb{P}_2}^*>_3.$$

4. The two-dimensional direction-of-arrival estimation method for a coprime surface array based on virtual domain tensor filling according to claim 1, wherein in the step (7), performing the canonical polyadic decomposition on the filled virtual domain tensor $\overline{K}_{\mathbb{Q}}$ to obtain the factor vectors $\hat{p}_k$, $\hat{q}_k$ and $\hat{c}_k$, and, then extracting the parameters $\hat{\mu}k=\sin(\hat{\varphi}_k)\cos(\hat{\theta}_k)$ and $\hat{v}_k=\sin(\varphi_k)\sin(\varphi_k)$ from $\overline{p}_k$ 和 $\hat{q}_k$ as follows:

$$\hat{\mu}_k = \left( \angle \left( \frac{\hat{p}_{k_{(\eta_1+1)}}}{\hat{p}_{k_{(\eta_1)}}} \right) + \angle \left( \frac{\hat{q}_{k_{(\eta_2+1)}}}{\hat{q}_{k_{(\eta_2)}}} \right) \right) / 2\pi,$$

$$\hat{v}_k = \left( \angle \left( \frac{\hat{p}_{k_{(P_x+\delta_1)}}}{\hat{p}_{k_{(\delta_1)}}} \right) + \angle \left( \frac{\hat{q}_{k_{(P_y+\delta_2)}}}{\hat{q}_{k_{(\delta_2)}}} \right) \right) / 2\pi,$$

wherein $\angle(\cdot)$ represents an operation of taking an argument of a complex number, and $a_{(a)}$ represents the ath element of a vector a; here, according to a Kronecker structure of $\hat{p}_k$ and $\hat{q}_k$, $\eta_1 \in [1, P_x P_y - 1]$ and $\eta_2 \in [1, L_x L_y - 1]$ respectively satisfy mod $(\eta_1, P_x) \neq 0$ and mod $(\eta_2, P_y) \neq 0$, and $\delta_1 \in [1, P_x P_y - P_x]$, $\delta_2 \in [1, L_x L_y - L_x]$, mod$(\in)$ represents an operation of taking a remainder; according to a relationship between the parameter ($\mu_k$, $v_k$) and a two-dimensional direction-of-arrival ($\theta_k$, $\varphi_k$), obtaining a closed-form solution of the two-dimensional direction-of-arrival estimation ($\hat{\theta}_k$, $\hat{\varphi}_k$) as follows:

$$\hat{\theta}_k = \arctan\left( \frac{\hat{v}_k}{\hat{\mu}_k} \right),$$

$$\hat{\varphi}_k = \sqrt{\hat{v}_k^2 + \hat{\mu}_k^2}.$$

* * * * *